(12) United States Patent
Mine et al.

(10) Patent No.: US 7,086,878 B2
(45) Date of Patent: Aug. 8, 2006

(54) OPTICAL CONNECTOR WITH SHUTTER

(75) Inventors: Keiji Mine, Yao (JP); Hiroshi Nakagawa, Souraku-gun (JP)

(73) Assignee: Hosiden Corporation, Yao (JP)

( * ) Notice: Subject to any disclaimer, the term of this patent is extended or adjusted under 35 U.S.C. 154(b) by 0 days.

(21) Appl. No.: 11/261,584

(22) Filed: Oct. 31, 2005

(65) Prior Publication Data
US 2006/0094273 A1    May 4, 2006

(30) Foreign Application Priority Data
Nov. 2, 2004    (JP)    .............................. 2004-319955

(51) Int. Cl.
*H01R 13/44*    (2006.01)
(52) U.S. Cl. .......................... 439/137; 385/72; 385/78
(58) Field of Classification Search ................. 439/137, 439/138; 385/72, 78
See application file for complete search history.

(56) References Cited

U.S. PATENT DOCUMENTS

| 5,065,004 | A | * | 11/1991 | Mizuno et al. ............. 235/483 |
| 5,179,504 | A | * | 1/1993 | Kitahara ..................... 439/137 |
| 6,352,375 | B1 | | 3/2002 | Shimoji et al. ............... 385/92 |
| 6,461,054 | B1 | | 10/2002 | Iwase ........................... 385/73 |
| 2003/0223703 | A1 | | 12/2003 | Chen et al. ................... 385/78 |
| 2004/0033030 | A1 | | 2/2004 | Ohbayashi et al. ........... 385/88 |

FOREIGN PATENT DOCUMENTS

JP    2001-201663    7/2001

OTHER PUBLICATIONS

European Search Report dated Jan. 9, 2006.

* cited by examiner

*Primary Examiner*—Tho D. Ta
(74) *Attorney, Agent, or Firm*—Armstrong, Kratz, Quintos, Hanson & Brooks, LLP

(57) ABSTRACT

The present invention seeks to provide an optical connector with an in-swinging shutter for closing a plug insertion opening of the connector, to avoid interference between the shutter and a plug holding part provided inside a plug insertion hole, to avoid increase in the outer dimensions of the connector by suppressing the accommodating space of the shutter. The in-swinging shutter has a two-piece hinge configuration in combination of a main shutter on the basal side and a sub shutter on the distal side. The sub shutter is hinge-coupled to the opening side end of the main shutter. The main shutter is elastically held at the closed position by a bias spring. The sub shutter is elastically held by another bias spring in a bent state in which it is bent towards the insertion opening side, or in a straightened state extending along the extended line of the basal side shutter.

4 Claims, 11 Drawing Sheets

OPTICAL CONNECTOR WITH SHUTTER

BACKGROUND OF THE INVENTION

1. Field of the Invention

The present invention relates to an optical connector used in optical data transmission, more specifically, to an optical connector with shutter for opening and closing an insertion opening, to where a plug of an optical fiber cable is inserted, with a shutter.

2. Description of the Related Art

The optical connector used in optical data transmission has, on both a transmission side and a reception side, a basic configuration including a combination of a case having an insertion hole to where the plug of the optical fiber cable is inserted and an optical element arranged at the back of the insertion hole so as to optically couple with the plug inserted into the insertion hole of the case.

In such optical connector, in order to prevent foreign materials such as dust from entering the insertion hole when the plug of the optical fiber cable is not inserted, the opening of the insertion hole, that is, the insertion opening is closed with an opening/closing type shutter.

Generally, the shutter here has a single swinging type hinge configuration that pivots with one side edge as the center, more specifically, two types of out-swinging type that opens towards the outside of the case and an in-swinging type that opens towards the inside of the case are known. However, in a case of the out-swinging type, the operation of opening the shutter when plugging the plug becomes necessary. Even in a slide type shutter that slides in a direction orthogonal to the direction of the plug insertion, the operation of opening the shutter also similarly becomes necessary. On the other hand, in a case of the in-swinging type, the shutter is automatically opened with the plugging operation of the plug, and thus the overall evaluation including operationality is high for the in-swinging type.

The optical connecter equipped with in-swinging shutter is disclosed in for example, Japanese Laid-Open Patent Publication No. 2001-201663. The conventional configuration of the optical connector of this type is described with reference to FIG. 10.

The optical connector with shutter shown in FIG. 10 includes a receptacle case 2 including an insertion hole 1 to where the plug of the optical fiber is inserted, an optical element 3 arranged at the back of the insertion hole 1 so as to optically couple with the plug inserted into the insertion hole 1 of the case 2, and an in-swinging shutter 4 that is hinge supported near the opening of the insertion hole and that opens inward with the insertion of the plug into the insertion hole 1.

The shutter 4 closes the insertion opening by being elastically held at a closed position by a bias spring not shown. When the plug is inserted into the insertion hole 1 of the case 2 in this state, the shutter 4 is pushed inward by the plug thereby pivoting inward with the hinge shaft as the center as shown with an arrow, and is pivoted until finally reaching a state of lying along an internal wall surface of the case 2 and completely opening the opening of the insertion hole 1, that is, the insertion opening. When the plug is extracted from such state, the shutter 4 automatically returns to its original closed position with the extraction of the plug by the biasing force of the bias spring.

Such optical connector with shutter includes that complying with for example, MOST standard. The MOST standard is an abbreviation of Media Oriented System Transport standard, one form of LAN for automobiles, for supporting high-speed optical data link of in-vehicle multimedia equipment such as car navigation system or in-vehicle audio, various changers and the like, and is a registered trademark of OASIS.

In the connector complying with the MOST standard, a cylindrical projection 5 projecting from a hole-back side of the plug insertion hole 1 towards the opening side is arranged. The projection 5 is a plug holding part that is inserted to the distal end part of the plug to hold the plug inserted into the plug insertion hole 1, and is usually referred to as a ferrule receiver. The plug inserted to the plug insertion hole 1 is passed through the inside of the plug holding part 5 and optically coupled with the optical element 3 in the case.

However, in the optical connector complying with the MOST standard and provided with an in-swinging shutter, the interference with the plug holding part 5 referred to as the ferrule receiver of when the shutter 4 is opened inward becomes a problem. That is, the pivot of the shutter 4 is inhibited by the plug holding part 5. In order to solve such problem, the distal end part of the plug holding part 5 is cut diagonally in the optical connector of FIG. 10. Consequently, the interference of the shutter 4 and the plug holding part 5 is avoided, but the plug holding part 5 may not satisfy the dimensions defined in the standard.

As an optical connector that has a configuration in which the interference between the in-swinging shutter and the plug holding part is avoided and the plug holding part is provided with the dimensions as defined in the standard, that shown in FIG. 11 is known. In the optical connector with shutter shown in FIG. 11, a so-called double door configuration in which the shutter 4 is divided into two parts of a main shutter 6 and a sub shutter 7 in a direction orthogonal to the hinge shaft is used, and each shutter is hinge-coupled to the case 2 on the opposing side and is elastically held at the closed position by the respective bias spring. With such configuration, the interference between the shutter 4 and the plug holding part 5 is avoided and the dimensions defined in the standard can be provided to the plug holding part 5.

On the other hand, however, a separate shutter accommodating part 9 for accommodating the sub shutter 7 becomes necessary on the side opposite the original shutter accommodating section 8 for accommodating the main shutter 6, thereby increasing the outer dimensions of the optical connector.

Further, as the bias spring for elastically holding the in-swinging shutter in the closed position, normally, a torsion coil spring including a pair of arms projecting from the coil part in two directions is arranged between the back surface of the shutter and the internal wall surface of the case. More specifically, in a state the coil part is faced towards the opening side and in combination with the hinge shaft of the shutter, the torsion coil spring is arranged between the back surface of the shutter and the internal wall surface of the case.

In this case, in the assembly step of the optical connector, in particular, in the step of attaching the shutter to the case, the task of attaching the torsion coil spring to the shutter in advance, and attaching the shutter to the case while pushing the arm on the case side down towards the shutter side become necessary. However, in the conventional optical connector, since the torsion coil spring attached to the shutter is unstable and the arm easily tilts to the right or the left, the workability of attaching the shutter to the case is very bad. Further, when the arm is tilted to the left or the right, the spring load as planned in designing may not be ensured.

SUMMARY OF THE INVENTION

The present invention is contrived in view of the above and aims to provide an optical connector with shutter that avoids, even if the plug holding part is arranged in the plug insertion hole, the interference with the shutter without cutting the plug holding part and that suppresses the accommodating space of the shutter as small as possible.

The present invention also aims to provide an optical connector with shutter that avoids the worsening of assembly workability due to instability of the torsion coil spring that biases the shutter in the closed state and the lack of spring load.

In order to achieve the above aim, the optical connector with shutter according to the present invention includes a receptacle case including an insertion hole to where a plug of an optical fiber is inserted; an optical element arranged at the back of the insertion hole to optically couple the plug inserted into the insertion hole of the case; an in-swinging shutter that is hinge supported in the vicinity of the opening of the insertion hole and that opens inward with the insertion of the plug into the insertion hole; and a biasing spring for elastically supporting the shutter in a closed state; wherein the shutter has a two-piece hinge configuration of being divided into two pieces in a direction orthogonal to a hinge shaft and in which a distal side shutter on the side away from the hinge shaft is hinge-coupled to an opening side end of a basal side shutter on the side closer to the hinge shaft.

In the optical connector with shutter according to the present invention, the shutter of two-piece hinge configuration is used. When closing the plug insertion opening, the shutter has the distal side shutter in a straightened state extended along the extended line of the basal side shutter. When the shutter is opened inward by being pushed by the plug, the basal side shutter is pushed by the plug. Here, the distal side shutter is bent for example, towards the insertion opening side with respect to the basal side shutter, and thus even if a plug holding part is arranged in the insertion hole, the interference between the holding part and the shutter is avoided.

When the shutter is opened and the plug is inserted towards the back, the distal side shutter is again in the straightened state extended along the extended line of the basal side shutter, and thus the increase in shutter accommodating space and the increase in the outer dimensions of the optical connector are avoided. When extracting the plug, the distal side shutter is bent for example, towards the opening side with respect to the basal side shutter, and thus the interference between the shutter and the plug holding part is avoided.

In the shutter of two-piece hinge configuration, the basal side shutter is elastically held at the closed position by the bias spring for the opening and closing of the opening by the shutter. In order to reliably operate the distal side shutter with respect to the basal side shutter, the distal side shutter is preferably elastically held in a predetermined state with a different bias spring. The holding state of the distal side shutter may be in a bent state in which it is bent towards the insertion opening side, or may be in a straightened state extending along the extended line of the basal side shutter.

In the former case, when the basal side shutter is elastically held at the closed position by its bias spring, the distal side shutter is pushed against the stopper of the insertion opening with a strong force by the bias spring of the basal side shutter, and thus is in a straightened state against the biasing force by its bias spring thereby closing the insertion opening. When the plug is pushed and the basal side shutter is opened inward, the distal side shutter is bent towards the insertion opening side by the biasing force of its bias spring. In a state the basal side shutter is completely opened, the distal side shutter is pushed by the plug and is in the straightened state against the biasing force of its bias spring.

In the latter case, the distal side is held in a straightened state by its bias spring in both the closed position and the accommodated position. When the basal side shutter is opened inward by being pushed by the plug, the distal side shutter contacts the plug holding part, thereby bending towards the insertion opening side, and is followed by the opening operation of the shutter. When the plug is extracted, and the distal side shutter returns from the opened position (accommodated position) to the closed position, the distal side shutter contacts the plug holding part from the opposite direction thereby bending towards the back of the hole, and is followed by the closing operation of the shutter.

For the bias spring for elastically holding the shutter in the closed state, a torsion coil spring including a pair of arms projecting from the coil part in two directions is arranged between the back surface of the shutter and inner wall surface of the case. In this case, the arm on the case side of the torsion coil spring is preferably fixed to the case. Thus, the torsion coil spring is fixed, and worsening of workability and lack of spring load due to instability in assembling are avoided.

The optical connector with shutter according to the present invention uses a shutter of two-piece hinge configuration, and thus even when a plug holding part is arranged in the plug insertion hole, the interference thereof with the shutter is avoided without cutting the plug holding part since the shutter can be bent. Further, since the accommodating part of the shutter is not distributed in two locations, and is concentrated in one location, the increase in the outer dimensions of the connector is avoided.

Moreover, when the torsion coil spring is used as the bias spring for elastically holding the shutter in the closed state, by fixing the arm on the case side to the case, worsening of workability and lack of spring load due to instability in assembling are avoided.

Figure 1:
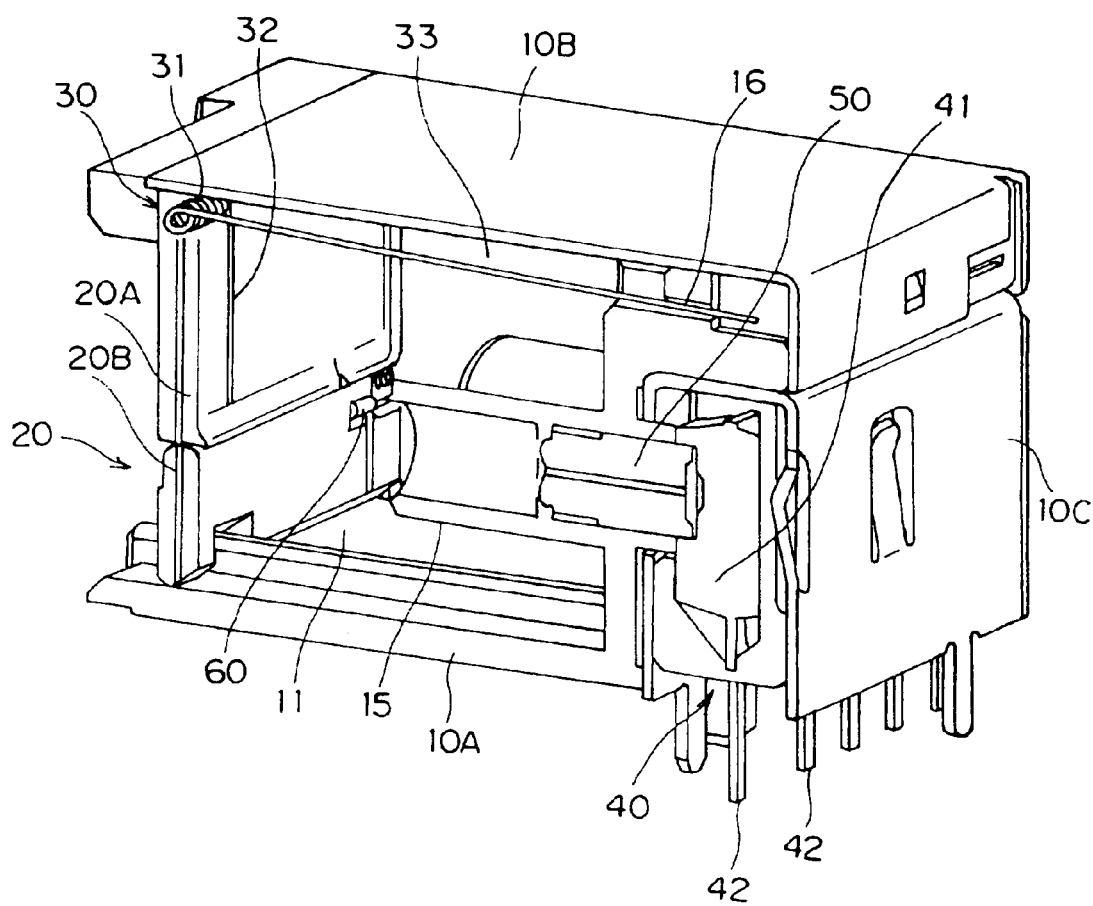
FIG. 1 is a perspective view of an optical connector with shutter according to one embodiment of the present invention and is a longitudinal sectional view.

EXPLANATION OF NUMERALS 10 case
10A body
10B first cover
10C second cover
11 plug insertion hole
12 rib (stopper)
13 key groove
14 guide surface
15 plug holding part
16 spring engaging part
17 upper surface opening part
18 fixing part
19 boss part
20 shutter
20A main shutter
20B sub shutter
21, 24 hinge shaft
22 boss part
23 sliding part
30, 60 bias spring
31 coil part
32, 33 arm part
40 optical element unit
41 optical element
42 lead part
50 sleeve

DETAILED DESCRIPTION OF THE PREFERRED EMBODIMENTS

Figure 2:
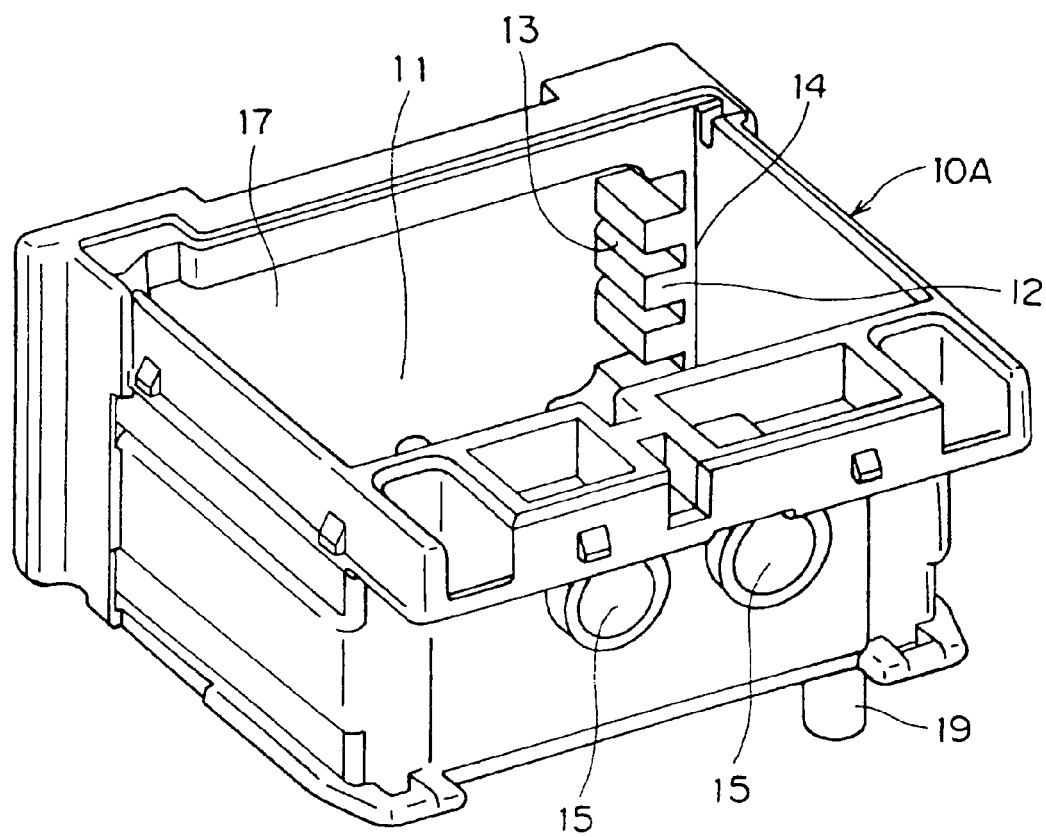
FIG. 2 is a perspective view showing a body configuration of the optical connector with shutter.
Figure 3:
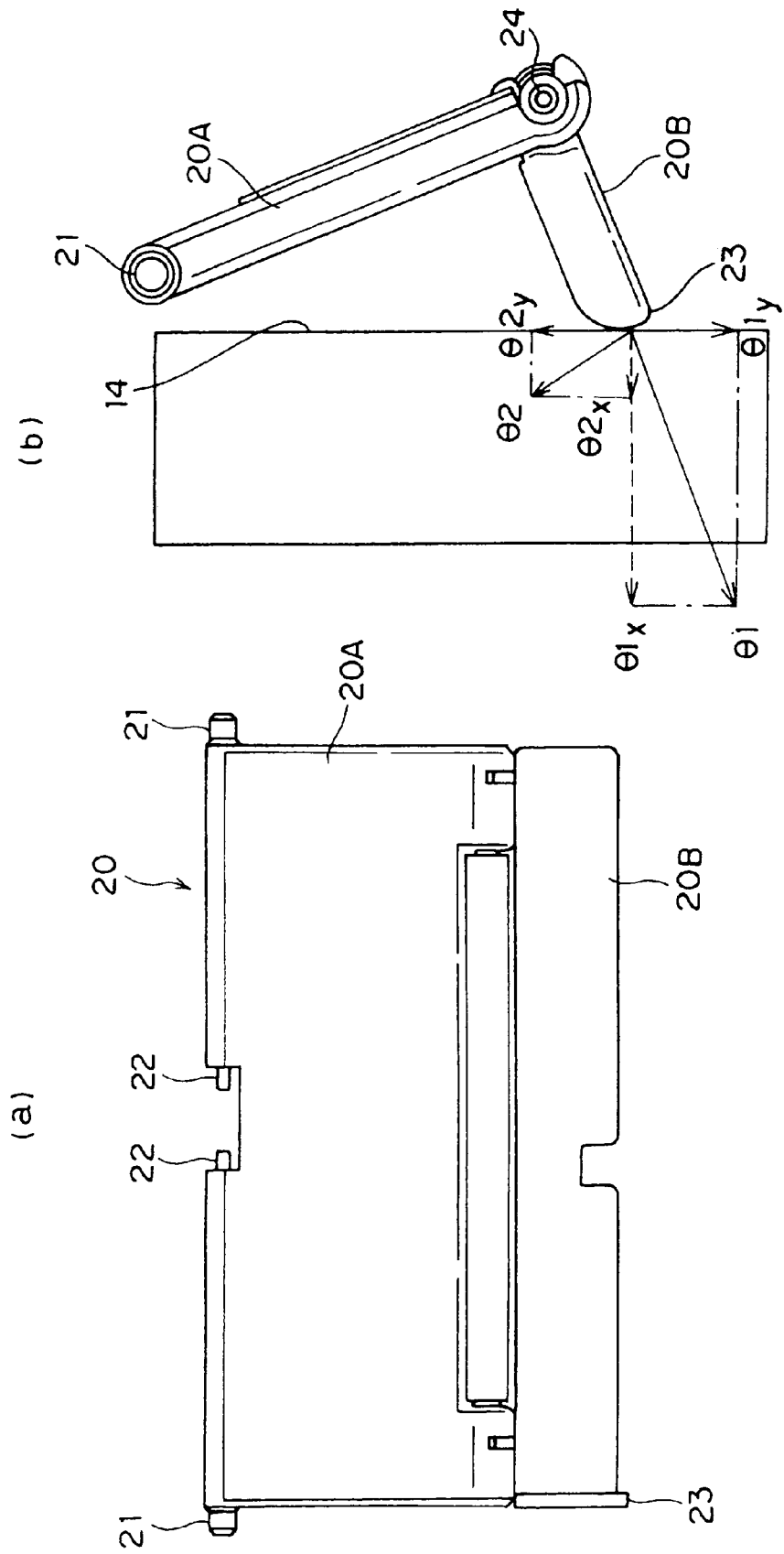
FIGS. 3(a) and (b) are a front view and a side view, respectively, of the shutter.
Figure 4:
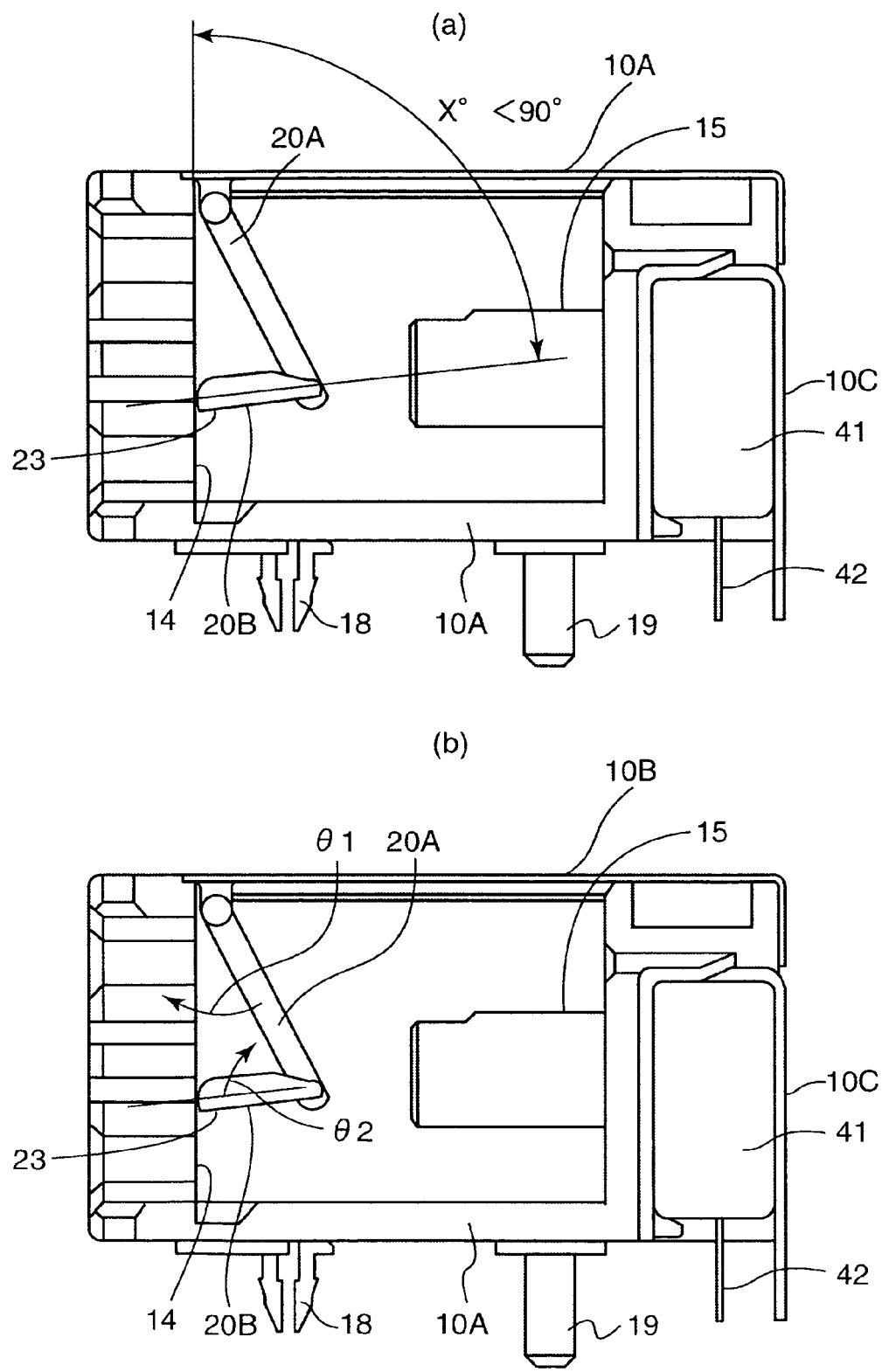
FIGS. 4(a) and (b) are longitudinal side views showing a mechanical relationship between the shutter and the body.
Figure 5:
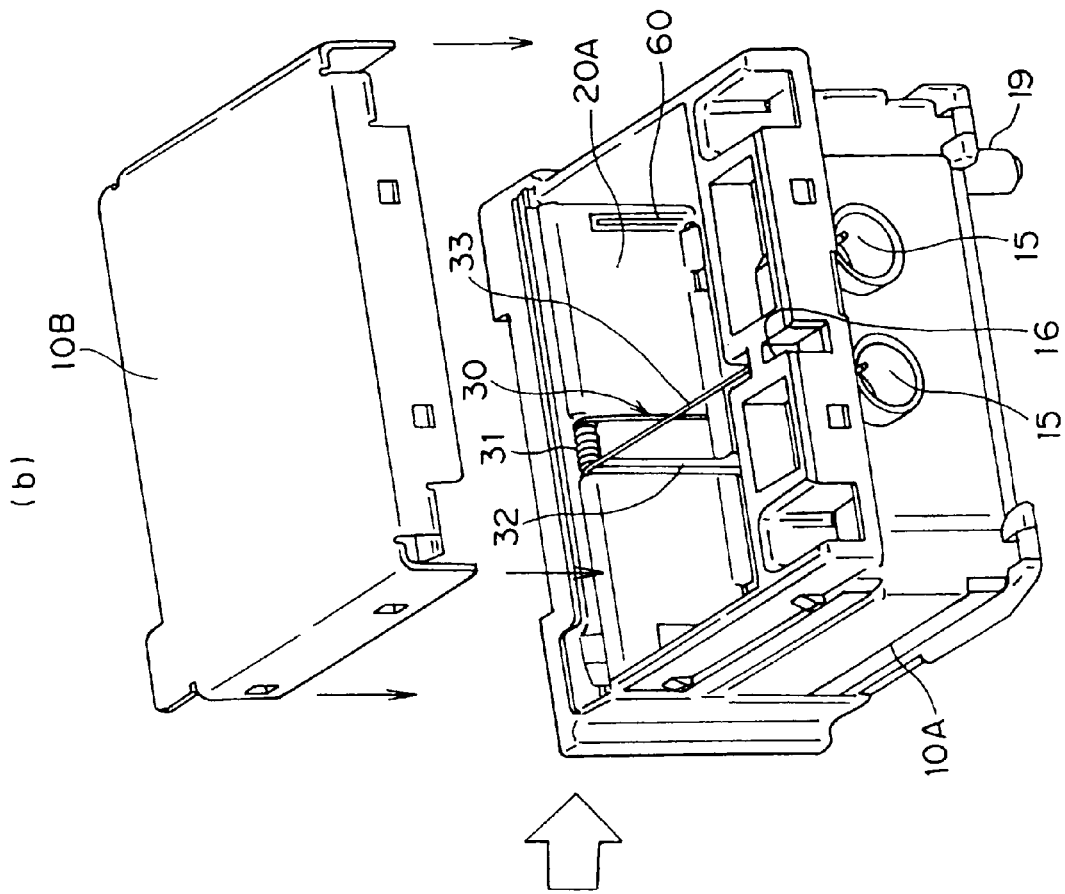
FIGS. 5(a) and (b) are perspective views showing assembly steps of the optical connector with shutter.
Figure 5:
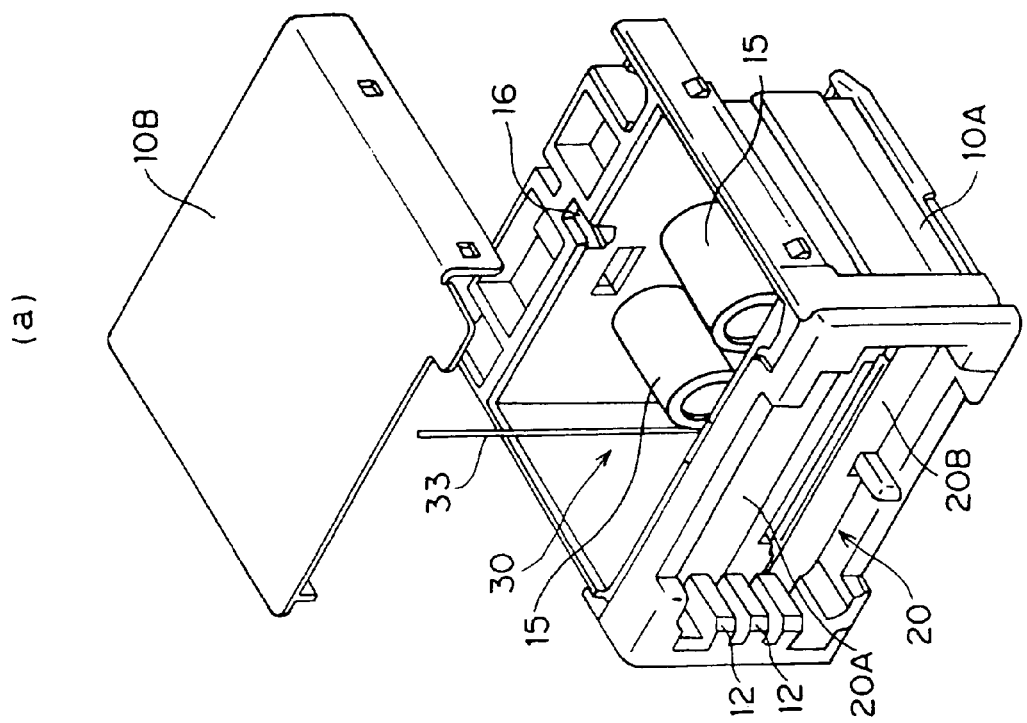
Figure 6:
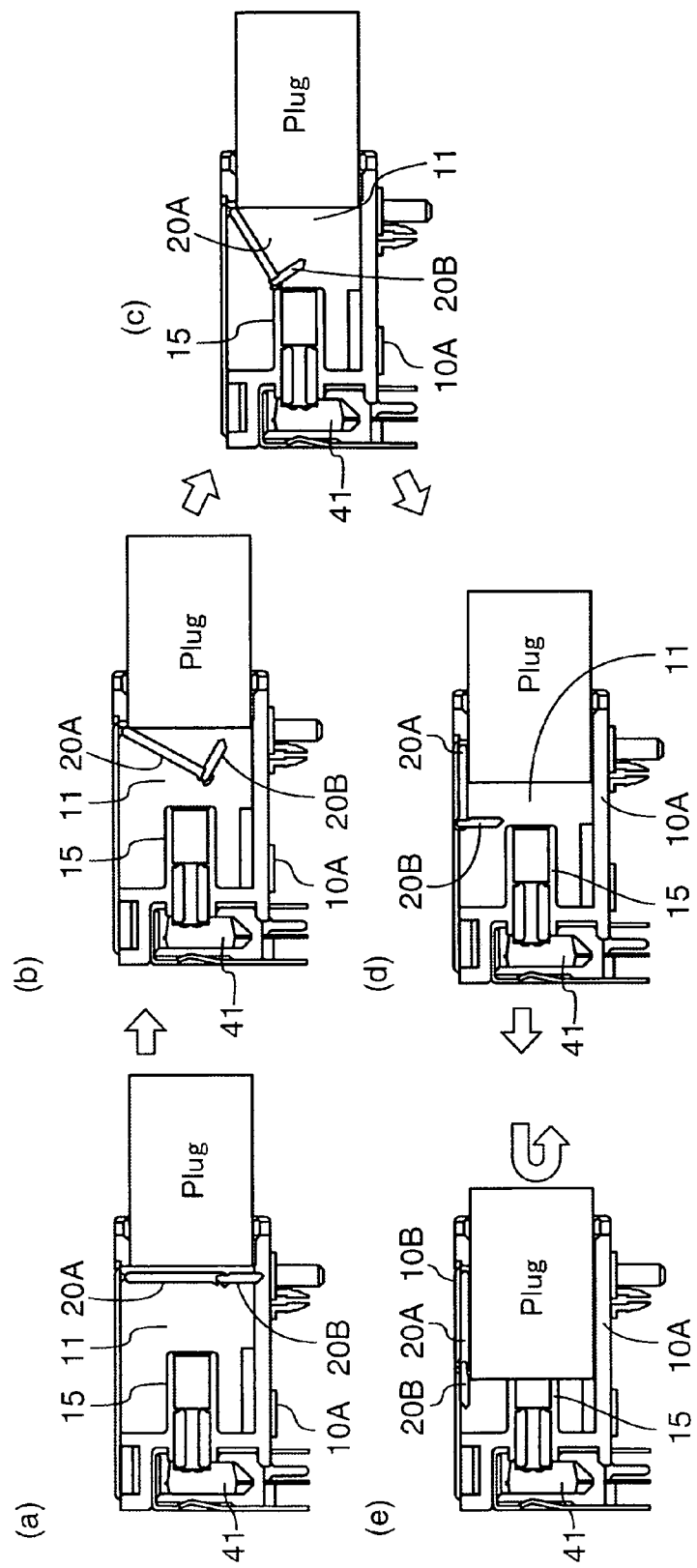
FIGS. 6(a) to (e) are longitudinal sectional views showing the shutter operation in the optical connector with shutter in stages.

The embodiments of the present invention will now be described based on the figures. FIG. 1 is a perspective view of an optical connector with shutter showing one embodiment of the present invention and is a longitudinal cross sectional view. FIG. 2 is a perspective view showing a body configuration of the optical connector with shutter, FIG. 3 is front view and a side view of the shutter, FIG. 4 is a longitudinal side view showing a mechanical relationship between the shutter and the body, FIG. 5 is a perspective view showing assembly steps of the optical connector with shutter, and FIG. 6 is a longitudinal sectional view showing the shutter operation in the optical connector with shutter in stages.

The optical connector with shutter according to the present embodiment is such in which the in-swinging shutter is attached to the optical connector complying with the above mentioned MOST standard. The optical connector with shutter according to the present embodiment is, as shown in FIG. 1, formed into a square box shape, and includes a case 10 having the plug insertion hole opened at the front surface, a shutter 20 of two-piece hinge configuration attached to the case 10 to open and close the opening of the plug insertion hole, that is, the insertion opening, a bias spring 30 arranged in the case 10 for elastically holding the shutter 20 in the closed position, and an optical element unit 40 attached to the rear surface side of the case 10.

The case 10 consists of a body 10A of a square box shape made of resin, a first cover 10B for covering the body 10A from above, and a second cover 10C for covering the body 10A from the rear surface side along with the optical element 40. The body 10A, as shown in FIG. 2, internally includes a rectangular plug insertion hole 11 opening on the front surface side, and in addition to the front surface, the upper surface is opened across the entire width in a range excluding the edge of the front surface side and the edge of the rear surface side.

A horizontal rib 12 projecting inward from one side wall is arranged in a plurality of steps in the vicinity of the plug insertion opening of the body 10A. The rib 12 of a plurality of steps is for forming a horizontal key groove 13 to identify the type of plug inserted to the optical connector between adjacent ribs, and by being arranged in the vicinity of the plug insertion opening of the body 10A in a restrictive manner, also functions as a stopper for securing the shutter 20 at the closed position. A vertical guide surface 14 at where the side edge of the shutter 20 contacts and slides is formed on the basal side of the rib 12 of a plurality of steps so as to face inward (hole back side).

A pair of left and right plug holding parts 15, 15 of cylindrical shape is formed on the back plate of the body 10A. The plug holding part 15, 15 referred to as ferrule receiver is projected from the back plate towards the plug insertion hole 11 and is inserted to the distal end part of the plug inserted into the plug insertion hole 11 to hold the same, and optically couples the plug to the optical element unit 40 of the rear surface side through the internal space. A sleeve 50 is inserted into the back part of the plug holding part 15, 15.

A roof part protruding towards the rear surface side is arranged on the back plate of the body 10A. A spring engaging part 16 for securing one part of the bias spring 30 is arranged on the roof part. The spring engaging part 16 is a spring see-through hole to where one part of the bias spring 30 is inserted, and is formed by a horizontal pass-through hole arranged on the vertical plate. Further, a positioning boss 19 is arranged projecting downward on the bottom plate of the body 10A.

The first cover 10B and the second cover 10C are made of metal thin plate. The first cover 10B applied from above to the body 10A blocks the opening 17 on the upper surface of the body 10A. The second cover 10C is formed into a U-shape when seen planar so as to cover the rear surface as well as the side surfaces on both sides of the body 10A, and forms a fixing part 18 projecting downward from the body 10A (refer to FIG. 4). The fixing part 18 is a fixing nail for fixing the relevant optical connector to a substrate.

The shutter 20 is a square resin plate that fully covers the opening of the plug insertion hole 11, namely, the insertion opening. The resin plate is arranged on the back side of the rib 12 arranged near the opening, and forms a single swinging, in-swinging shutter 20 that opens inward with the upper edge as the center. The shutter, as shown in FIG. 3, is configured by a main shutter 20A arranged on the upper side, that is, the basal side and a sub shutter 20B coupled to the distal side, that is, the lower side.

The main shutter 20A or the basal side shutter includes a pair of hinge shafts 21, 21 and is supported so as to be opened inward of the plug insertion hole 11 with the upper edge as the center by engaging the hinge shaft 21, 21 to the upper surface of the side wall on both sides of the body 10A. The length of the main shutter 20A is set to a dimension in which the relevant shutter does not interfere with the plug holding part 15, 15 on the inside when opened inward. The main shutter 20A is biased to the closing side by the bias spring 30, and includes a pair of left and right bosses 22 for holding the bias spring 30 at the central portion of the upper edge.

The sub shutter 20B or the distal side shutter is hinge-coupled in a freely pivoting manner to the lower edge of the main shutter 20A by the hinge shaft 24. A sliding part 23 for contacting the vertical guide surface 14 of the body 10A is arranged on one side edge of the sub shutter 20B. The sliding part 23 is projected with a circular arc shape towards the distal side of the sub shutter 20B.

The sub shutter 20B is biased towards a direction that can be bent outward, that is, the front surface side by a bias spring 60. The maximum bending angle of the sub shutter 20B is, as shown in FIG. 4(a), set in accordance with the length of the sub shutter 20B so that in a state the sub shutter 20B is bent at the maximum angle towards the front surface side with respect to the main shutter 20A and the sliding part 23 is contacted to the guide surface 14, the contacting angle X° of the sub shutter 20B with respect to the guide surface 14 is less than 90°.

The bias spring 30 for biasing the main shutter 20A is arranged on the back surface side of the shutter in the plug insertion hole 11. The bias spring 30 is a torsion coil spring including a coil part 30, and two arms 32, 33 projecting from both ends of the coil part 31, 31 in the opposite direction. The coil part 31 is concentrically held with respect to the hinge shaft 21, 21 by the boss 22, 22 at the central portion of the upper edge of the main shutter 20A. One of the arm 32, that is, the arm 32 on the shutter side is contacted to the rear surface of the main shutter 20A. The other arm 33, that is, the arm 33 on the case side has the distal end portion inserted into a spring engaging part 16 consisting of a spring see-through hole of the body 10A in a state forcibly bent with respect to the other arm 32.

Thus, the main shutter 20A is biased in the closing direction. Further, through the fixation to the main shutter 20A of the coil part 31 by the boss 22, 22 and the fixation to the body 10A of the arm 33 by the insertion to the spring engaging part 16, the bias spring 30 is positioned and fixed leaving a degree of freedom for bending.

The bias spring 60 for biasing the sub shutter 20B consists of a torsion coil spring smaller than the bias spring 30, and is bent into a V-shape in a state the arms on both sides do not apply external force. Thus, the coil spring is substantially positioned on the hinge shaft of the sub shutter 20B, one arm is contacted from the rear surface side to the main shutter 20A, and the other arm is contacted from the rear surface side to the sub shutter 20B, and thus the bias spring 60 biases the sub shutter 20B towards the front surface side, and elastically holds the same in a state bent substantially 90° towards the front surface side in a state no external force is applied to the sub shutter 20B.

The spring force of the bias spring 60 is, as shown in FIG. 3(b) and FIG. 4(b), set so as to satisfy the following equation 1 with the biasing force for the bias spring 30 as θ1 in a state the sub shutter 20B is bent at maximum angle towards the front surface side with respect to the main shutter 20A, and the sliding part 23 is contacted the guide surface 14, the biasing force of the bias spring 60 in the same state as θ2, and the coefficient of friction between the sliding part 23 and the guide surface 14 as μ.

$$\theta 1_y > \theta 2_y + \mu \cdot (\theta 1_x + \theta 2_x) \quad (1)$$

Here, $\theta 1_x$ is a horizontal component of $\theta 1$, $\theta 1_y$ is a vertical component of $\theta 1$, $\theta 2_x$ is a horizontal component of $\theta 2$, and $\theta 2_y$ is a vertical component of $\theta 2$.

If the bias springs 30, 60 satisfy the relationship of equation 1, after the sub shutter 20B is bent at maximum angle towards the front surface side with respect to the main shutter 20A, and the sliding part 23 is contacted to the guide surface 14, the sub shutter 20B gradually decreases the inclination angle against the biasing force of the bias spring 60, and eventually, the inclination angle becomes 0 and the main shutter 20A and the sub shutter 20B closely attaches to the rib 12 of a plurality of steps acting as a stopper, and completely closes the insertion opening. When the relationship is not satisfied, the inclined sub shutter 20B does not stand up, and the shutter 20 is not in a completely closed state. The sliding portion 23 is made into a circular arc shape so as to have the friction between the sliding part 23 and the guide surface 14 small and even.

The length of the sub shutter 20B is, basically, a value obtained by subtracting the length of the main shutter 20A from the entire length of the shutter 20, and is generally shorter than the main shutter 20A.

The optical element unit 40 is fixed to the rear surface side of the body 10A using the second cover 10C. The unit 40 is built with a pair of optical elements 41, 41 on both sides, and a plurality of lead parts 42 extended respectively is projected downward. The optical element 41 41 is optically connected with the plug inserted into the plug insertion hole 11 by way of the plug holding parts 15, 15 arranged on the back plate of the body 10A and the sleeve 50, 50 inserted to the back part thereof.

The function of the optical connector with shutter according to the present invention will now be described in detail with reference to FIG. 5 and FIG. 6.

In the assembly of the optical connector, in particular, in the attachment of the shutter 20, the sub shutter 20B is coupled to the main shutter 20A and the bias spring 30 is attached to the main shutter 20A, and the bias spring 60 is attached to the sub shutter 20B. In this state, as shown in FIG. 5(a), the main shutter 20A is temporarily attached to the body 10A. In this stage, the fist cover 10B is not yet attached, and the arm 33 on the case side of the bias spring 30 is projected upward.

When the main shutter 20A is temporarily attached to the body 10A, as shown in FIG. 5(b), the arm 33 on the case side of the bias spring 30 is bent at substantially right angles to the arm 32 on the cover side, to have the distal end part inserted into the spring engaging part 16 of the body 10A. Thus, the bias spring 30 is positioned and fixed leaving only a degree of freedom for bending. Thereafter, the first cover 10B is attached to the body 10A, and the attachment of the shutter 20 is finished.

The inclination of the bias spring 30, in particular, the event of the arm 33 on the case side inclining to the left and right is avoided, and thus the workability in the attachment work of the shutter 20 is enhanced. Further, the spring load is stabilized.

The method of using the optical connector after attachment is as follows. When not using the optical connector, that is, when the plug of the optical fiber cable is not inserted into the plug insertion hole 11 of the case 10, as shown in FIG. 6(a), the entrance of the plug insertion hole 11, that is, the plug insertion opening is closed by the shutter 20. More specifically, the main shutter 20A of the shutter 20 is elastically pushed towards the opening side, that is, the closed side by the bias spring 30, and if the pressing force exceeds the biasing force by the bias spring 60 towards the opening side of the sub shutter 20B, the sub shutter 20B is extended in a straightened state and is elastically pushed against the rib 12 acting as the stopper of the body 10A with the main shutter 20A.

When inserting the plug of the optical fiber cable into the plug insertion hole 11 of the case 10, the plug is pushed into the plug insertion hole 11 from the front surface side with the shutter 20 closed. Thus, as shown in FIGS. 6(b), (c), (d), the main shutter 20A is opened inward against the biasing force by the bias spring 30. When the main shutter 20A separates away from the rib 12 acting as the stopper, the sub shutter 20B is bent substantially at right angles towards the opening side by the biasing force of the bias spring 60.

Since the main shutter 20A is shorter than the entire length of the shutter 20, and the sub shutter 20B can be bent towards the opening side, the shutter 20 can be opened to the accommodating position without contacting the plug holding part 15, 15. The plug holding part 15, 15 is not performed with cutting to avoid interference and has the dimensions defined in the standard.

When the plug is completely pushed in, as shown in FIG. 6(e), the main shutter 20A is accommodated along the ceiling surface of the first cover 10B. The sub shutter 20B is pushed by the plug and extended along the extended line of the main shutter 20A, and is accommodated along the ceiling surface of the first cover 10B along with the main shutter 20A. Since the sub shutter 20B is in a straightened state and accommodated along with the main shutter 20A, the thickness of the accommodating space does not increase. The plug holding part 15, 15 is inserted to the distal end portion of the plug to hold the plug.

When the plug is extracted from the plug insertion hole 11, the main shutter 20A again returns to the vertical closed position by the restoring force of the bias spring 30, and is pushed against the rib 12. Here, the sub shutter 20B returns to the straightened state since the sliding part 23 is pushed against the guide surface 14 of the body 10A and is sled downward along the guide surface 14 and is pushed against the rib 12 with the main shutter 20A. Thus, the plug insertion opening is again closed by the shutter 20.

Figure 7:
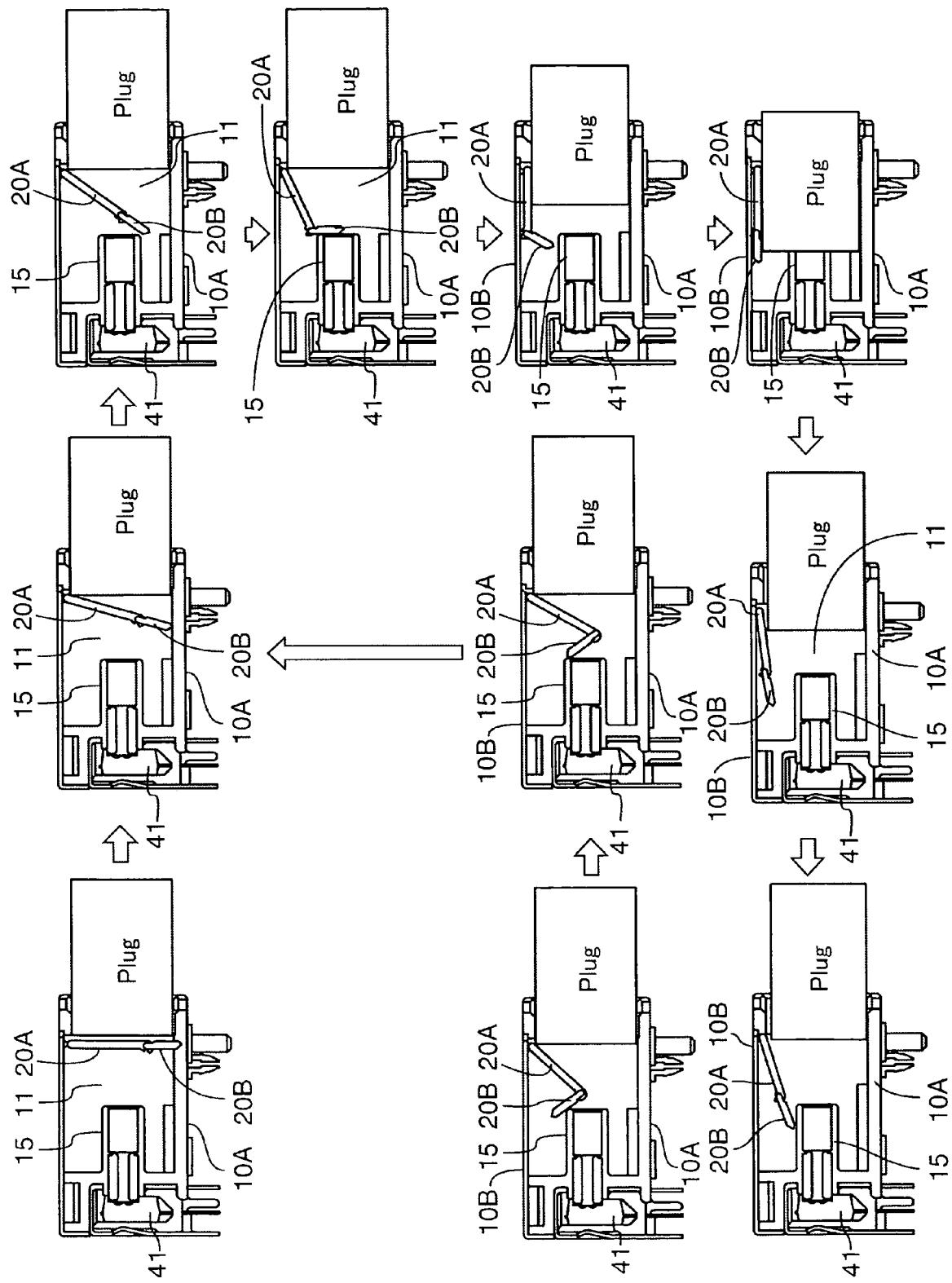
FIG. 7 is a longitudinal side view of the optical connector with shutter according to another embodiment of the present invention in which the operation of the shutter is shown in steps.

FIG. 7 is a longitudinal side view of the optical connector with shutter showing another embodiment of the present invention, and shows the operation of the shutter in steps.

The optical connector with shutter according to the present embodiment differs from the optical connector with shutter shown in FIG. 1 to FIG. 6 in the configuration of the shutter 20, more specifically, the configuration of the bias spring to bias the sub shutter 20B. Other configurations are substantially the same as the optical connector with shutter shown in FIG. 1 to FIG. 6 and thus the same reference characters are denoted for the same parts and the detailed explanation thereof is omitted.

In the optical connector with shutter according to the present embodiment, the shutter 20 has a two-piece hinge configuration in which the sub shutter 20B is coupled below the main shutter 20A. The bias spring for biasing the main shutter 20A elastically holds the main shutter 20A at the closed position. The bias spring for biasing the sub shutter 20B elastically holds the sub shutter 20B in a straightened state with respect to the main shutter 20A, and differs in this aspect from the optical connector with shutter shown in FIG. 1 to FIG. 6. The biasing force for biasing the sub shutter 20B is set to be smaller than the biasing force for biasing the main shutter 20A.

In the optical connector with shutter according to the present embodiment, the main shutter similarly opens and closes with the insertion and extraction of the plug. The sub shutter 20B is pivotable inward and to the opening side, and when the main shutter 20A is pivoted to the opening position (accommodating position) from the closed position, contacts the plug holding part 15, 15 but guarantees the opening operation of the shutter 20 by being bent towards the opening side by the plug holding part 15, 15.

In the accommodating position, the sub shutter 20B is positioned on the extended line of the main shutter 20A by the bias spring, and is accommodated along the first cover 10B with the main shutter 20A.

When the main shutter 20A is pivoted to the closed position (accommodated position) from the opened position, the sub shutter 20B contacts the plug holding part 15, 15 on the way, but when pushed by the plug holding part 15, 15 and bend inward, guarantees the opening operation of the shutter 20.

Therefore, in the optical connector with shutter according to the present invention as well, the operation inhibition by the interference with the plug holding part 15, 15 is avoided by the bending of the sub shutter 20B, and a smooth opening/closing operation of the shutter 20 is guaranteed even if the plug holding part 15, 15 has the dimensions defined in the standard.

Figure 8:
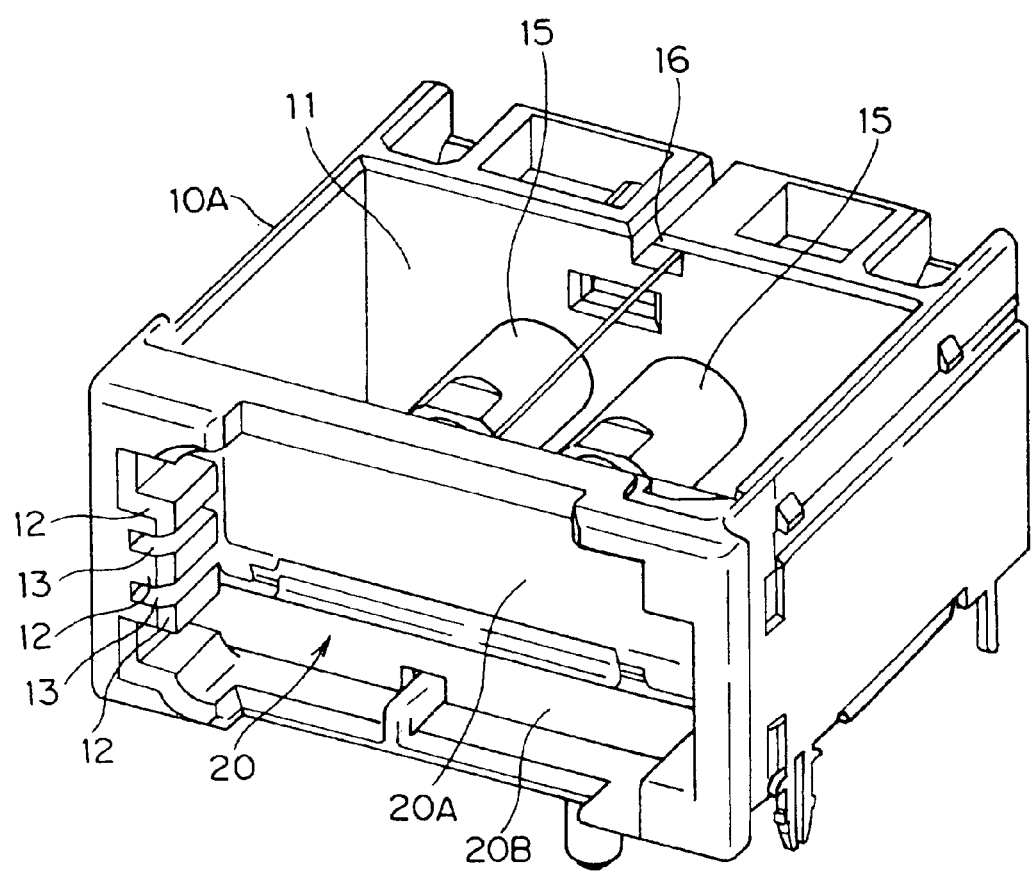
FIG. 8 is a perspective view of the optical connector with shutter according to another embodiment of the present invention showing a state in which the cover is removed.

FIG. 8 is a longitudinal side view of an optical connector with shutter showing another embodiment of the present invention, and shows a state in which the cover is removed.

In the optical connector with shutter according to the present embodiment, the configuration for fixing the bias spring 30 is different. Other configurations are substantially the same as the optical connector with shutter described above and thus the same reference characters are denoted for the same parts and the detailed explanation thereof is omitted.

In the above mentioned optical connector with shutter, in order to fix the bias spring 30 for biasing the main shutter 20A, the arm 33 on the case side is inserted to the spring engaging part 16 consisting of a spring see-through hole of the body 10A. In the optical connector with shutter according to the present embodiment, on the other hand, the hooking configuration in which the arm 33 on the case side is hooked to the spring engaging part 16 arranged on the upper edge of the back plate of the body 10A is provided. That is, the spring engaging part 16 here includes a hook part formed adjacent to a groove part to hook and engage the distal end part of the arm 33. The bias spring 30 is fixed with such hooking configuration.

Figure 9:
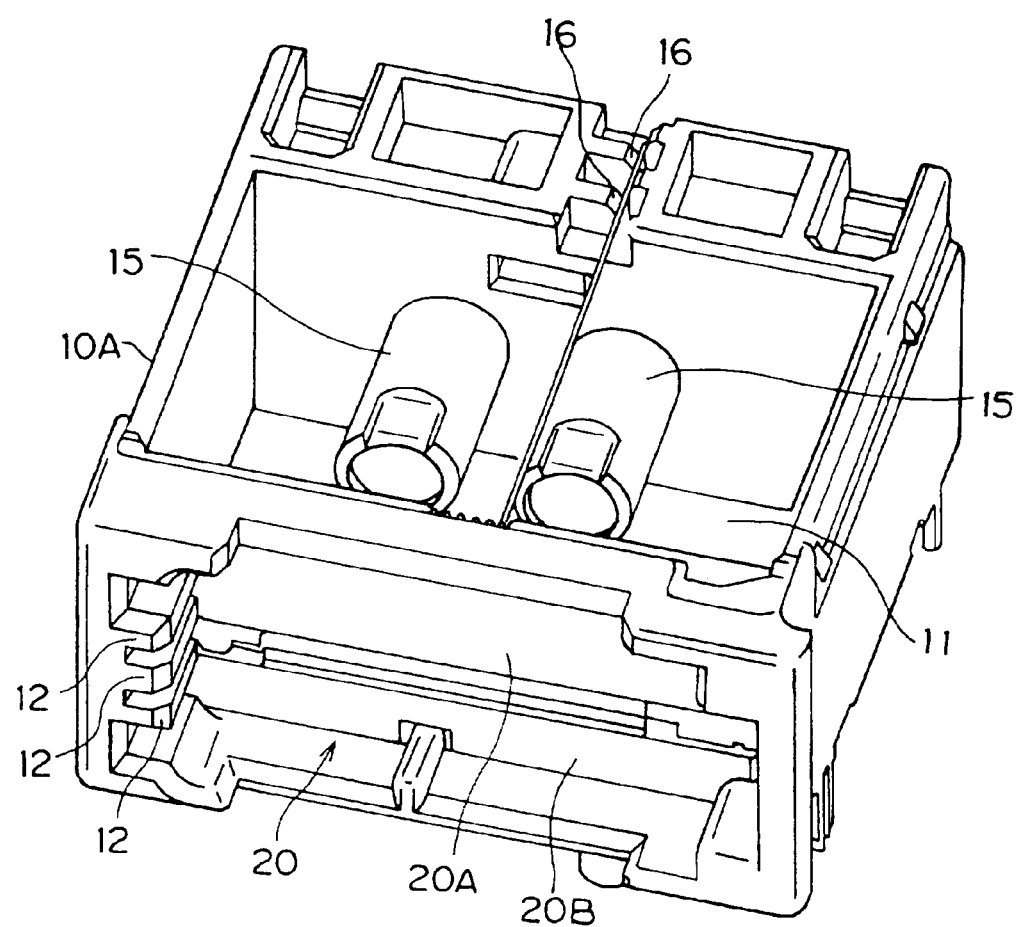
FIG. 9 is a perspective view of the optical connector with shutter according to another embodiment of the present invention showing a state in which the cover is removed.
Figure 10:
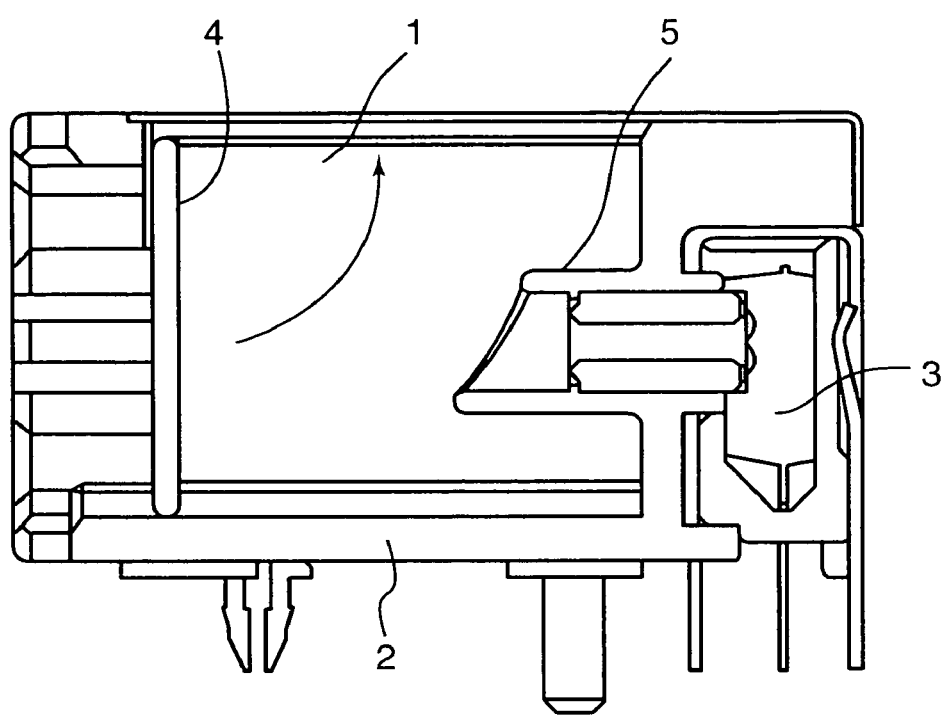
FIG. 10 is a longitudinal sectional view of a conventional optical connector with shutter.
Figure 11:
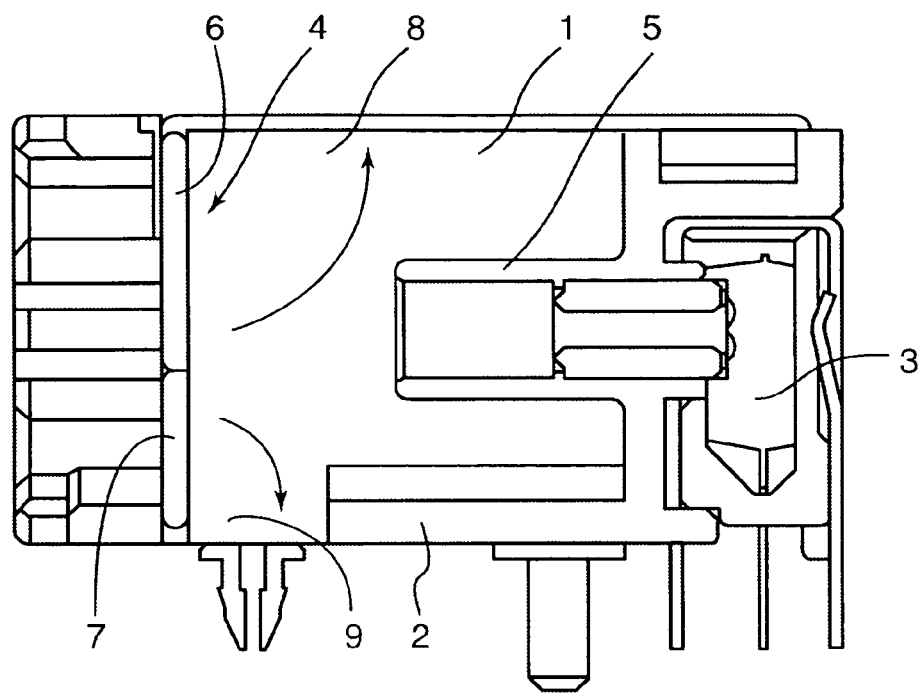
FIG. 11 is a longitudinal sectional view of a conventional optical connector with shutter.

As shown in FIG. 9, the bias spring 30 is fixed by press fitting the distal end portion of the arm 33 on the case side to the spring engaging part 16, 16 made of a cut-out arranged at the roof part protruding from the back plate of the body 10A to the rear surface side.

What is claimed is:

1. An optical connector with shutter comprising:
    a receptacle case including an insertion hole for inserting a plug of an optical fiber thereinto;
    an optical element arranged at the back of the insertion hole to optically couple the plug inserted into the insertion hole of the case;
    an in-swinging shutter that is hinge supported in the vicinity of an opening of the insertion hole and that opens inward in response to the insertion of the plug into the insertion hole; and
    a biasing spring for elastically supporting the shutter in a closed state; wherein
    the shutter has a two-piece hinge configuration of being divided into two pieces in a direction orthogonal to a hinge shaft and in which a distal side shutter on the side away from the hinge shaft is hinge-coupled to an opening side end of a basal side shutter on the side closer to the hinge shaft.

2. The optical connector with shutter as claimed in claim 1, wherein the receptacle case includes a tubular plug holding part projecting from an inner back side towards the opening side so as to be inserted into a distal end of the plug inserted to the insertion hole; and the shutter has a configu ration of avoiding interference with the plug holding part since the distal side shutter is bent with respect to the basal side shutter during opening/closing.

3. The optical connector with shutter as claimed in claim 1, wherein the bias spring elastically holds the basal side shutter in a closed position; and the distal side shutter is elastically held in a bent state or a straightened state with respect to the basal side shutter by a separate bias spring.

4. The optical connector with shutter as claimed in claim 1, wherein the bias spring is a torsion coil spring, including a pair of arms projecting in two directions from a coil part, arranged between a back surface of the shutter and an inner wall surface of the case and having the arm on the case side fixed to the case.

* * * * *